Jan. 5, 1943.　　　J. B. COOPER　　　2,307,199
AIRCRAFT CABIN PRESSURE CONTROLLER
Filed Aug. 5, 1940　　　3 Sheets-Sheet 1

Inventor
James B. Cooper
By Reynolds & Beach
Attorney

Jan. 5, 1943.    J. B. COOPER    2,307,199
AIRCRAFT CABIN PRESSURE CONTROLLER
Filed Aug. 5, 1940    3 Sheets-Sheet 3

Inventor
James B. Cooper
By Reynolds & Beach
Attorney

Patented Jan. 5, 1943

2,307,199

UNITED STATES PATENT OFFICE 2,307,199

AIRCRAFT CABIN PRESSURE CONTROLLER

James B. Cooper, Seattle, Wash., assignor to Boeing Aircraft Company, Seattle, Wash., a corporation of Washington Application August 5, 1940, Serial No. 351,485

16 Claims. (Cl. 128—204)

My invention relates to mechanism for establishing a desired pressure within a sealed cabin, such as that of an aircraft, in excess of the exterior atmospheric pressure, and for selecting the rate at which the cabin pressure may change, either increase or decrease, under certain conditions to be described more fully hereafter. My invention is in the nature of an improvement upon the Pressure control system for aircraft cabins, disclosed in Patent No. 2,208,554, July 16, 1940, and the Rate-of-pressure-change control for pressure cabins, disclosed in the application of Nathan C. Price, Serial No. 216,028, filed June 27, 1938, respectively.

My device is capable of operating in conjunction with suitable mechanism for supercharging the cabins of airplanes, but it may be used for controlling the rate of pressure change in cabins which are not supercharged, so long as it is used with a cabin capable of retaining a pressure differential, namely one which is pressure-tight or substantially so. Moreover, my mechanism may be used in conjunction with a source of air under pressure to constitute means for establishing a supercharged condition within a cabin in any desired degree, and for maintaining such supercharged condition.

Some of the uses of my mechanism may be outlined. For example, the rate of decrease in cabin pressure as the aircraft rises may be established at a lesser rate than that of the exterior atmosphere. Any desired pressure, within limits, may be established in the cabin whatever the altitude may be. Furthermore, although the aircraft may be maintaining a constant altitude, the supercharging of the cabin may, at will, be changed arbitrarily between zero differential and a predetermined differential limit. During descent of the aircraft the rate of pressure change within the cabin may be limited to a value less than that of the exterior change of pressure, provided that the cabin has initially been supercharged. In such operation the supercharging differential will gradually be reduced, although both the internal pressure and the external pressure are increasing, for their rates of increase will be different.

These operations are accomplished preferably by providing a valve controlling the exhaust of air from the cabin, replacement air under pressure being continually forced into the cabin. For certain operations, however, such as in regulating the rate of pressure decrease during ascent of the aircraft, it may not even be necessary to supply air under pressure to the cabin, although such continual source of replacement air is highly desirable, particularly to assure adequate ventilation. The degree of valve opening, together with the pressure differential between the internal cabin pressure and the external atmospheric pressure, as well as the amount and pressure of the incoming air, determines the pressure maintained or the rate of pressure change within the aircraft cabin. Despite some variation in the cabin air supply, and in the pressure differential between the cabin and the external atmospheric pressure, the pressure maintained within the cabin or the rate of pressure change within the cabin can be regulated by governing the rate of opening or closing of the cabin air outlet or similar flow control valve.

It is desired to emphasize that the regulation of cabin pressure (assuming a supply to the cabin of air under adequate pressure) will now be seen to be under the sole control of an outlet valve, suitably automatically controlled. Control of inlet pressure or volume, as disclosed in Patent No. 2,208,554, is not, per se, essential to proper control of cabin pressure, so long as the outlet control functions as intended.

While other valve-operating mechanism might be provided, I prefer that the valve be moved by a servo motor consisting of a rather loosely fitting piston, or otherwise arranged for limited leakage from one side to the other, the opposite sides of which piston are subjected to differential pressure. For example, the lower side of the piston may be in communication with the relatively higher internal cabin pressure, and the upper side in communication with the relatively lower external atmospheric pressure. Air from the high pressure side of the piston will slowly leak past the piston and be discharged to the atmosphere, communication with which may be regulated. If the atmosphere connection is closed the pressures on both sides of the valve piston quickly become equalized; the larger the connection between the upper, low-pressure side of the piston and the atmosphere the more quickly air bypassing the piston is removed, and the more the pressure on this side of the piston drops, tending to approach the external pressure. Relatively higher pressure below the piston causes it to move upward, and consequently the interconnected flow control valve is opened farther to lower the cabin pressure. The rate of flow from the upper, low-pressure end of the cylinder to the atmosphere controls the rate of piston and valve displacement as well as the position of rest assumed. Control of the size of the connection between the upper end of the piston cylinder and the external atmosphere may therefore be effected, by a suitable valve, to vary the cabin pressure sustained, proportional to the amount of valve opening, and also the rate at which the cabin pressure may be changed, depending upon the speed of valve displacement in changing its size of opening.

An indicator, which may be of the aneroid barometer type, should be provided to show at all times the apparent altitude to which the cabin pressure corresponds, and another instrument, a rate-of-pressure-change gauge, which may be connected with the cabin pressure controller, should designate the rate at which the cabin pressure is changing, preferably in terms of apparent rate of climb or descent.

The controller itself is preferably merely a mechanism for varying the restriction of the passage affording communication between the low pressure side of the servo motor piston for the cabin outflow valve and the external atmosphere. In brief, the more communication of the servo motor with the atmosphere is restricted, the quicker will the exhaust valve tend to close and the faster will the cabin pressure be increased or the higher will be the supercharged differential maintained when the valve comes to its position of equilibrium. Conversely, the less the restriction provided in the passage communicating between the servo motor and the external atmosphere, the more widely and quickly will the valve tend to open, the lower will be the supercharged differential, and the more rapidly will the pressure within the cabin drop.

The objects of my invention, then, are to provide a simplified control for establishing a pressure differential between the internal cabin pressure and the external atmospheric pressure of an aircraft, to be able to maintain a constant supercharged pressure, to be able to change such pressure differential within limits at will, and to afford regulation of the rate of change of cabin pressure entailed in such variation of the supercharged differential.

A further object is to limit the rate of increase in cabin pressure as the aircraft descends or the rate of decrease in cabin pressure as the aircraft climbs.

Still another object is, at any altitude of the aircraft, to maintain a desired pressure differential less than the maximum limiting differential for such altitudes.

I desire to accomplish the foregoing objects by control mechanism for varying the pressure to which a differential pressure operated servo motor for a cabin air flow control valve is subjected. My improved control itself is of simple construction and easy to operate.

Additional objects accomplished by my particular operating mechanism will be understood from the following detailed description.

My invention as illustrated in the drawings is presented in the form which I now prefer, but modifications within the scope of the appended claims may be desirable for installations of different types and for different requirements.

Figure 2:
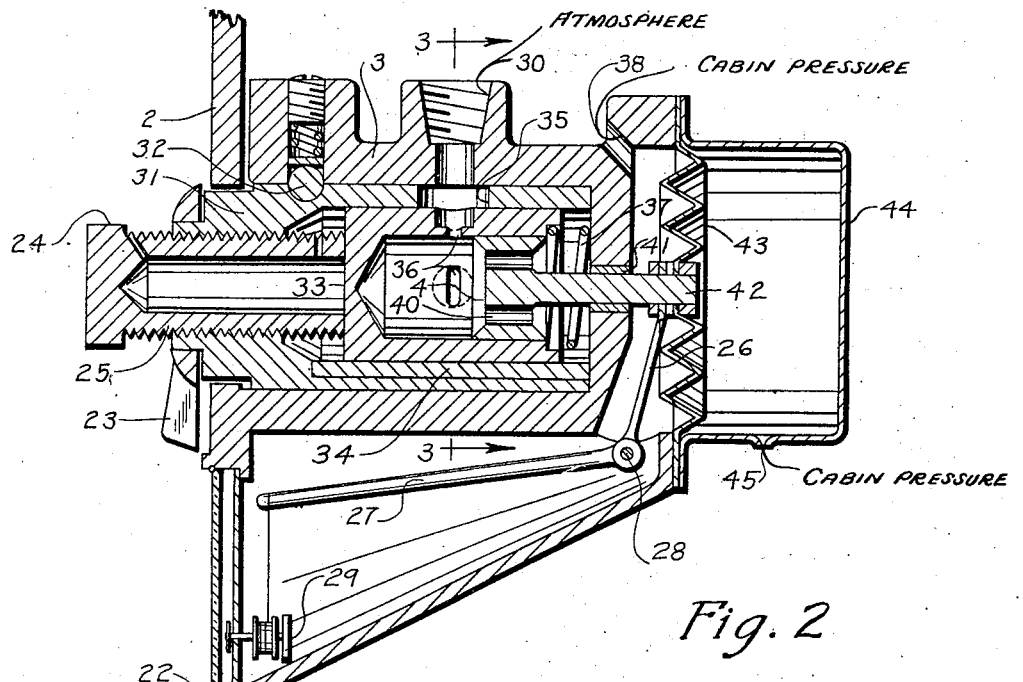
Figure 2 is a longitudinal section through my device, taken along the line 2—2 of Figure 1.

Figures 6 to 10 inclusive are diagrammatic views similar to Figure 2, showing the parts in various operating positions.

Figure 11:
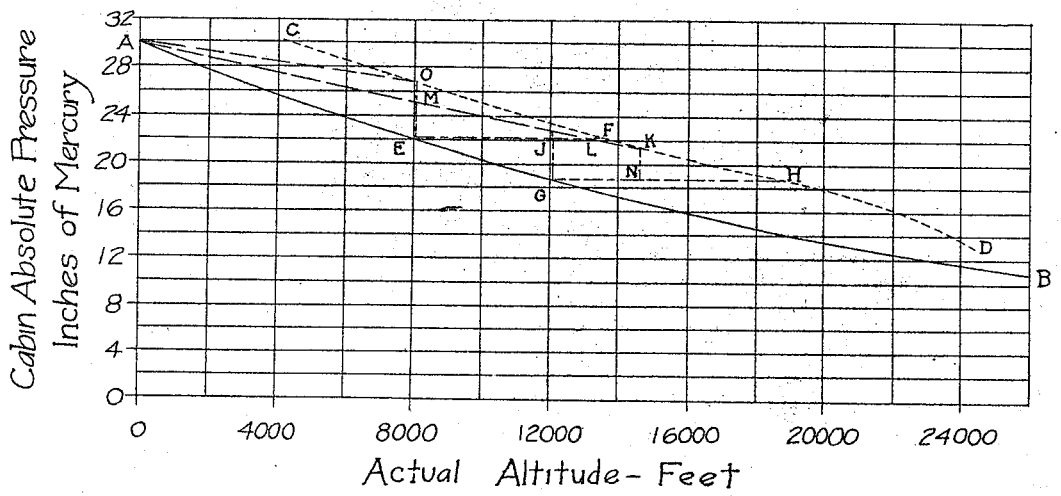

Figure 11 is a graph illustrative of the various types of operation which my mechanism is capable of effecting.

The pressure within an unsupercharged aircraft cabin would normally be the same as the external atmospheric pressure, and would vary with altitude in the manner indicated by the pressure curve A—B of Figure 11. In order to contribute to the comfort of the passengers when flying at high altitudes it is desirable to provide supercharging mechanism which will maintain a positive pressure differential within the cabin over the external atmospheric pressure. Theoretically it would be desirable to maintain normal or sea level atmospheric pressure within the cabin, but this is not feasible from a practical standpoint because the cabin structure would be too greatly stressed at high altitudes, and it is impracticable to make the cabin sufficiently leak-proof, or to provide sufficient supercharger capacity. Furthermore it has been found that sea level pressure is not necessary for reasonable comfort of the passengers, but that a pressure corresponding to the external atmospheric pressure at 8,000 feet is not uncomfortable, and reasonable comfort is even afforded by maintaining a pressure equivalent to the atmospheric pressure at 12,000 feet. In extreme instances even the lower pressures corresponding to higher altitudes are bearable, particularly in preference to the very low pressures at extremely high altitudes.

In the design of a particular airplane it has been found that design factors limit the practical differential between internal cabin pressure and external cabin pressure to approximately 2½ pounds per square inch, corresponding to a 5-inch difference in mercury column height. Suitable mechanism may be provided for preventing the establishment of a cabin pressure differential which would exceed this value, or any other chosen value. Moreover, certain supercharging mechanism cannot operate to maintain a greater differential than this at altitudes over 20,000 feet. We may establish a pressure differential limit, then, at the line C—D of Figure 11. My control has been devised to operate in the pressure-altitude zone between these two lines, and various types of pressure control may be accomplished thereby within these limits.

One operation of which my device is capable is the maintenance of a constant pressure corresponding to the pressure at a particular altitude between lines A—B and C—D. Thus, for example, while the airplane is flying between 8,000 and 14,000 feet the pressure in the cabin may be maintained constant at a value corresponding to the 8,000 foot level, such pressure line being indicated in Figure 11 at E—F. Moreover, between the limits mentioned, a pressure corresponding to any altitude either above or below 8,000 feet may be maintained. If the airplane is to operate between altitudes higher than 14,000 feet it may be desirable to establish a constant but lower pressure, such as G—H, corresponding to a pressure equivalent to that at the 12,000 foot altitude, being maintained between the 12,000 foot and the 19,000 foot levels. If the aircraft does not intend to rise above 4,000 feet, sea level pressure may be preserved in the cabin;

in such case no actual supercharging is necessary.

If the aircraft should descend below the altitude to which the constant pressure corresponds, the cabin pressure will rise along the line A—B, whereas if the aircraft should climb to an altitude higher than the intersection of the constant pressure line with the line C—D, the cabin pressure will decrease along such line as the aircraft ascends, but when the aircraft again descends to such point the constant pressure established by my control can again be maintained over the range between lines A—B and C—D.

A second type of operation of which my control is capable is the induction of a pressure change, either rise or fall, within the limits previously mentioned. Thus if the pilot had intended to fly at an altitude between 8,000 and 14,000 feet, and the control should be set to maintain a pressure represented by the line E—F within the cabin, and at 12,000 feet the pilot should find it necessary to change his flying range from 12,000 to 19,000 feet, he may induce a pressure drop at 12,000 feet along the line J—G while the aircraft maintains the 12,000 foot altitude. After the cabin pressure reaches the point G this pressure, represented by the line G—H, may thereafter be maintained while the aircraft flies at altitudes between 12,000 and 19,000 feet. Conversely, if the aircraft is to fly at a lower altitude, and the control has been set for the pressure represented by the line G—H, an induced pressure rise along the line G—J may be effected, and when this line is reached such pressure may be maintained while the aircraft flies in this zone.

A further important function of my device is to limit the rate of pressure change within an aircraft cabin when the aircraft is ascending at a rapid rate, and more particularly when the aircraft is descending quickly, in which latter case a rapid pressure rise would normally occur. As the aircraft climbs, the pressure would normally decrease along the line A—B. I prefer, however, that the decrease in cabin pressure be at a less rapid rate, such as substantially along the line A—K. If the aircraft intends to cruise at an elevation between 8,000 and 14,000 feet, therefore, and it is desired to establish the constant pressure represented by the line E—F, the cabin pressure may decrease from A to L while the exterior pressure decreases along the line A—E. If the aircraft reaches its cruising altitude at a point above 8,000 feet, the resulting cabin pressure will be in excess of the exterior atmospheric pressure at such altitude.

My control may operate, however, where the cabin pressure at the cruising altitude will actually be the same as the external atmospheric pressure, and yet the pressure drop to such pressure within the cabin can be at a lesser rate than the drop in external pressure. Thus if the aircraft is to cruise at 8000 feet, for example, the cabin pressure instead of dropping freely along the line A—E, might be influenced to decrease substantially along the line A—M while the aircraft is climbing to 8,000 feet, and then, while cruising at that altitude, the cabin pressure may be allowed to drop either at the same rate or at a different rate along the line M—E until the internal pressure is equal to the atmospheric pressure. Similarly if the aircraft is to cruise at an altitude between 12,000 feet and 19,000 feet the pressure within the cabin may still be allowed to decrease substantially along the line A—K while the aircraft is climbing to above 14,000 feet, and after reaching its cruising altitude the cabin pressure may be allowed to decrease further along the line K—N, at a controlled rate, to the point N on the constant pressure line G—H.

The reverse operation may be accomplished during descent of the aircraft, but in such case supercharging equipment is necessary. Assuming that the aircraft is flying at nearly 15,000 feet, a pressure rise within the cabin may be induced from N to K before the aircraft begins to descend, and then the pressure may be allowed to rise from K to A while the aircraft is descending at a speed such as would cause an external pressure rise along line B—A. As another example, the pilot, while flying at 8,000 feet, may contemplate a descent, and he may induce a pressure rise from E to M prior to commencing such descent, and then allow the pressure to increase substantially along line M—A within the cabin while the external pressure increases from E to A. If a still slower pressure rise is desired, or if a faster descent is contemplated, the pilot may induce a pressure rise from E to the point O on line C—D (representing the maximum permissible differential), and then allow the cabin pressure to increase from O to A while the exterior pressure is increasing from E to A.

It will be evident from the above discussion that the examples given of operations which may be performed are merely representative and approximate, and that various other types of operations may be accomplished. The principal consideration is that the pilot be able to establish a desired cabin pressure or a desired rate of cabin pressure change by a simple operation, and that he be aware of the existing conditions at all times, so that he may control the mechanism to obtain the operation intended.

Figure 1:
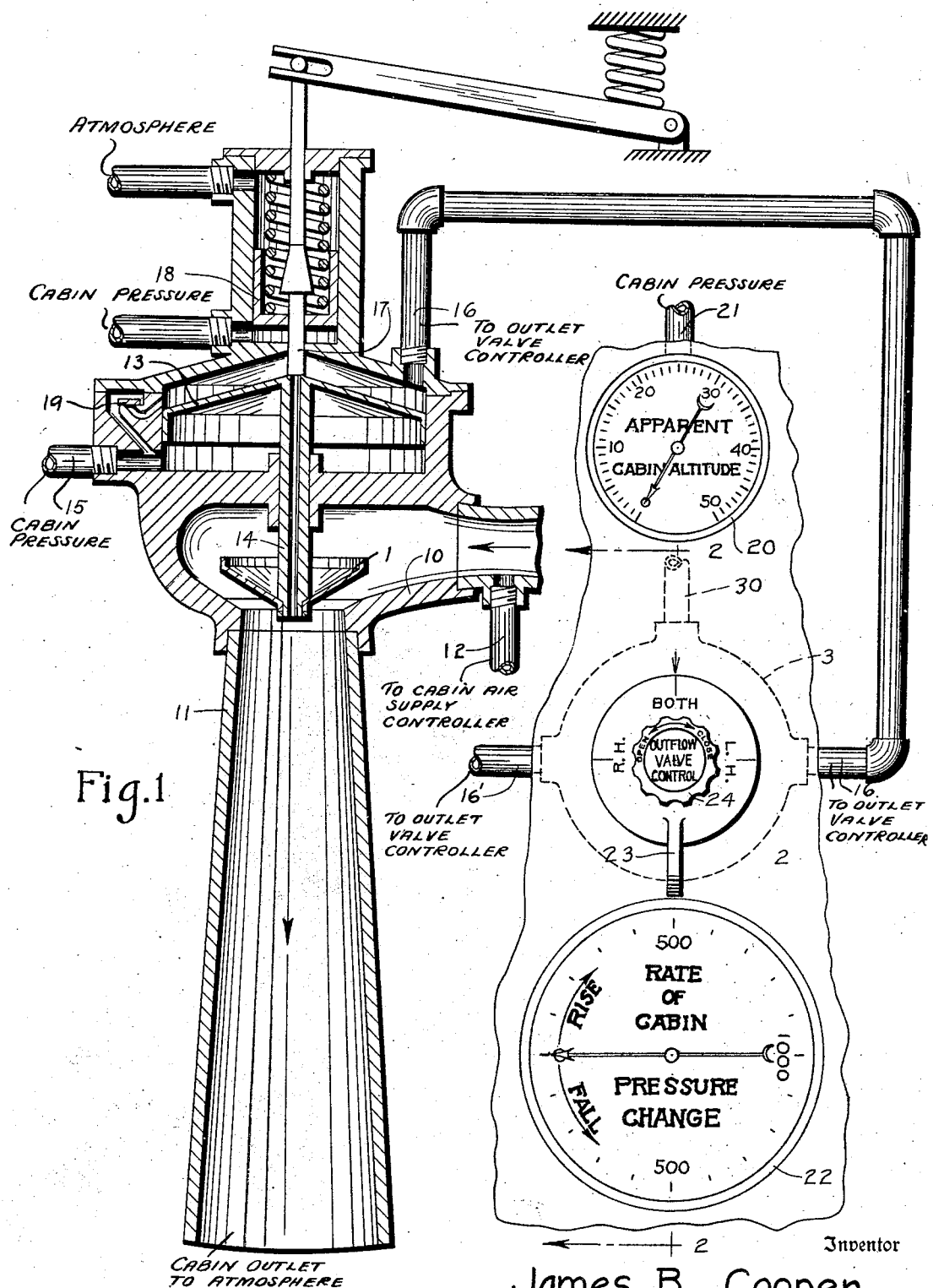
Figure 1 is an assembly view, somewhat diagrammatic in form, showing my control device in front elevation, and, in section, air flow regulating valve mechanism of the type disclosed in the aforesaid Price patent and application.

My control device is intended for use with cabin air supply and flow regulating mechanism of the type disclosed in the above mentioned patent and application of Nathan C. Price. A portion of such mechanism is illustrated in Figure 1 as including a valve I for controlling the flow through and perhaps the pressure within the aircraft cabin, preferably located in the conduit 10, having an outlet 11 whence air is discharged from the cabin. Supercharging mechanism is provided for delivering replacement air under pressure to the cabin, and the pressure maintained within the cabin depends upon the delivery of air to it, and also upon the opening of valve I controlling the air discharge. An automatic controller, to regulate the intake valve mechanism for the cabin air supply, may be provided, if desired. For this purpose the type employed in the above mentioned Price application, with which a conduit 12 is intended to communicate, may be employed. This conduit 12 corresponds to that numbered 83' in Fig. 1 of such application. The valve I is moved by a servo device including a piston 13 which is connected to it by a hollow stem 14. A conduit 15 communicating with the cylinder beneath piston 13 affords communication with the cabin pressure. Such piston fits loosely within its cylinder, so that air may bleed or leak from its under side to its upper side either around the piston I or through a suitably restricted by-pass (not shown), for discharge to the atmosphere either through a conduit 16 or through the bore of stem 14. Normally this bore of stem 14 is closed by a pin 17 of a pressure differential control device which limits the maximum differential of internal cabin pressure over external atmospheric pressure, represented by line C—D of Figure 11.

Opening of the valve 1 normally tends to decrease the cabin pressure by increasing the rate of outflow (assuming no corresponding increase of the rate of flow). Conversely, moving valve 1 toward closed position tends to restrict outflow and thus increases cabin pressure. If communication between the upper side of piston 13 and the atmosphere, both through stem 14 and conduit 16, is cut off, the pressures on the opposite sides of this piston will approach equalization by leakage of air from its under side to its upper side, so that it will exert no upward force on valve 1; in such case the valve 1 is moved toward closed position by the outward air flow, and by its own weight, resulting in an increase in cabin pressure. If such increase tends to exceed the maximum differential, selected as 2½ pounds, the piston 18 will rise, overcoming its biasing spring, and will lift with it pin 17, thus establishing communication through hollow stem 14 between the atmosphere and the upper side of piston 13. Air will thereupon be withdrawn from the chamber above the piston, so that its pressure will be lower than the pressure beneath such piston, causing it and interconnected valve 1 to be forced upward, resulting in an increased outflow from the cabin, and a consequent reduction in the differential between cabin pressure and external atmospheric pressure. This maximum pressure differential control, responding to cabin pressure below piston 18 and external atmospheric pressure above such piston, will thus override all other controls, and prevent the selected limiting pressure differential from being exceeded by my control mechanism.

If upon rapid descent of the aircraft the external pressure should increase so quickly that it tends to surpass the cabin pressure, the pressure above piston 13, by communication through conduit 16, may exceed that below this piston. A by-pass passage, controlled by a check valve 19, is provided, which under such conditions will open to establish communication between the upper and lower sides of the piston for equalizing such pressure. Thus instead of valve 1 being forced closed by the superior pressure acting on the upper side of the piston 13, the servo control will be rendered temporarily ineffective, and, driven by the excessive external pressure, air will move upwardly past valve 1 into the cabin, opposite to its normal course, in case the supercharging mechanism does not supply air under pressure to the cabin at a rate sufficiently rapid to compensate for such abrupt increase in external pressure.

The control over the rate of cabin pressure change afforded by my device ceases when pin 17 is unseated, since such control is effected by throttling communication between the upper side of piston 13 and the atmosphere, afforded through conduit 16, control unit 3, and external atmosphere connection 30. The operation of the rate of pressure change control is based on the fact that as such communication is throttled to a greater extent the pressures on opposite sides of the piston 13 become more nearly equal, and valve 1 tends to close, whereas if communication between the space above piston 13 and the atmosphere is less restricted, assuming that local atmosphere pressure is lower than cabin pressure, the pressure beneath piston 13 will force it upward to open valve 1 for increasing the outflow from the cabin, thus reducing its pressure or retarding a rise of pressure therein, correspondingly. Pin 17, therefore, and its operating mechanism, constitutes an overriding safety device, at all times preserving the cabin supercharge differential within predetermined limits, however rapid the change in cabin pressure must be, to avoid exceeding such maximum supercharge differential.

The indicating and control mechanism of my device is shown in Figure 1 to include, mounted on an instrument panel 2, an altimeter 20 of conventional type connected to the cabin by a conduit 21 to indicate at all times to the pilot the apparent cabin altitude, and a rate-of-pressure-change gauge 22 associated with the control device, which indicates the rate at which the apparent cabin altitude is changing. Such rate of change in cabin pressure is shown accurately by this instrument whether caused by a change in altitude of the aircraft, by the pilot inducing a change in apparent cabin altitude without any altitude change of the aircraft, or as a result of a combination of the above factors. This gauge is preferably graduated to indicate change in apparent cabin altitude shown by altimeter 20 in feet per minute. Ordinarily there are two pressure control valve units, and my device 3 is adapted to control either or both of these, one being connected thereto by the conduit 16, and the other by a conduit 16'. The handle 23, in the position shown in Figure 1, will control both valve units (see Figure 3), but if this handle is swung to the left through 90° (see Figure 5) the unit illustrated in Figure 1, alone, will be controlled, while if the handle is swung to the right from the position of Figure 1 through 90° (see Figure 4) the similar valve unit with which conduit 16' communicates, alone, will be operative. This result is achieved by a valve sleeve 31 (see Figures 2 to 5) to which the handle 23 is connected.

As has been explained, if the outflow valve 1 is moved toward closed position by restriction of conduit 16 the cabin pressure tends to rise, and this operation may be accomplished by the throttling control unit 3 described hereafter by the pilot rotating valve control knob 24 in a clockwise direction, as indicated in Figure 1. Rotation of this knob effects reciprocation of a sleeve 33, as will later appear. The farther the knob is thus turned clockwise the greater will be the throttling of atmosphere connection 16, the more nearly will pressure above piston 13 approach the pressure below it, the more will outflow valve 1 tend to close, and consequently the faster will be the rate of cabin pressure increase. If, on the other hand, this control knob is rotated counterclockwise, less throttling action will be effected by control unit 3, air will flow more rapidly to the atmosphere through conduits 16 and 30 from above piston 13, the pressure differential between the lower side of piston 13 and its upper side will increase, valve 1, controlling outflow of air from the cabin, will tend to open wider, and the cabin pressure will drop toward external atmospheric pressure. If the aircraft is climbing rapidly and the valve 1 is fully open, such operation of the knob 24 would tend to keep it open. If the aircraft is climbing the tendency normally would be for the cabin pressure to decrease, and in order to prevent too rapid a decrease the knob 24 should be rotated sufficiently in a clockwise direction to enable the valve 1 to close somewhat and throttle the outrush of air from the cabin. To accelerate the rate of pressure decrease knob 24 would be turned in a counterclockwise direction.

Since gauge 22 in practice is operatively connected with the controller 3, as knob 24 is turned in a clockwise direction the hand of the gauge will also move in a clockwise direction, either indicating a decrease in rate of pressure fall or an increase in rate of pressure rise. If, on the other hand, knob 24 is turned in a counterclockwise direction, the hand of indicator 22 will turn in a counterclockwise direction, indicating a decrease in the rate of cabin pressure rise or an increase in the rate of cabin pressure fall. Further, if the apparent cabin altitude indicated by altimeter 20 is the same as the actual aircraft altitude, rotation of knob 24 in a clockwise direction, tending to increase cabin pressure, will move the altimeter hand progressively in a counterclockwise direction, indicating a lower apparent altitude of the cabin, corresponding to the increasing cabin pressure, at a rate depending on the setting of knob 24, and corresponding to the position of gauge 22 hand clockwise from zero, designating that an induced rise in cabin pressure is being effected at the rate indicated. When the desired apparent cabin altitude is reached knob 24 may be turned in a counterclockwise direction, if necessary, the hand of rate indicator 22 returning to zero, and the apparent cabin altitude thus established will be designated by altimeter 20 as its hand comes to rest. The response of gauge 22 to rotation of knob 24 may be by way of a direct connection therebetween, or through the response of mechanism controlled by the knob 24.

As has been stated previously, my control accomplishes the operations which have been described by varying the restriction of conduit 16 affording communication between the cylinder in which servo piston 13 moves and the external atmosphere connection 30. The operation parts of my device are shown best in Figures 2, 3, 4, and 5. Within the outer casing of control unit 3 is formed a cylindrical aperture receiving a rotatable sleeve 31 snugly therein. Movement of this sleeve lengthwise of the unit is prevented by provision of a detent 32 fitting in a peripheral groove of such sleeve, which groove has three depressions corresponding to the three rotative positions of this sleeve shown in Figures 3, 4, and 5, respectively. Within the sleeve is received a further snugly fitting sleeve 33 which is reciprocable with respect to sleeve 31, but held from rotation with respect to such sleeve by a key 34. These sleeves have three pairs of registering apertures, 35 in sleeve 31 and 36 in sleeve 32, coinciding with the peripheral disposition of apertures in the outer casing of unit 3 for communicating with the atmosphere conduit 30 and with the two flow-controlling valve unit conduits 16 and 16'.

These parts thus constitute a three-way valve mechanism, affording selective communication between the atmosphere conduit 30 and either one or both of the control valve conduits 16 and 16'. As the handle 23 is swung to the right in Figure 1 the interconnected sleeves 31 and 33 will be rotated from the position of Figure 3 to the position of Figure 4. In this position of the parts, as previously stated, communication is afforded between the atmospheric connection 30 and only the conduit 16' of one outlet valve unit. When the handle 23 is swung in the opposite direction the sleeves 31 and 33 rotate into the position of Figure 5, so that this time communication is afforded only through conduit 16 between the atmosphere and the other valve unit. In whichever selected position illustrated in these three figures the sleeves 31 and 33 are held by the detent 32, the operation of my control mechanism will be the same. In the following description of such control, therefore, the rotative position of these cylinders selected can be disregarded.

Within sleeve 33 is guided a reciprocable valve 4 adapted to cooperate with apertures 36. As will be evident from Figures 3, 4, and 5, as well as from Figure 2, the apertures 35, 36 all lie in the same transverse plane of sleeve 33, and it is therefore necessary to consider the coaction of valve 4 with only one of such apertures. The cylindrical interior of sleeve 33, in which the valve moves, constitutes one section of the passage between conduit 30 and one or both of conduits 16 and 16'. The valve 4 does not act as a piston because the two ends of its chamber are in free communication through apertures 40 extending through the valve. Such internal chamber is sealed from its surrounding atmosphere, however, by a packing ring 41, disposed about valve stem 42. The fit of the sleeve 33 in sleeve 31, and in turn its fit within the outer casing of the unit, are air-tight.

As has been stated, sleeve 31 is not reciprocable lengthwise, but sleeve 33 and valve 4 are both reciprocable with respect to sleeve 31, sleeve 3 being reciprocable by the pilot while valve 4 is automatically reciprocated in response to an excessive rate of pressure change, either rise or fall, within the aircraft cabin.

Reciprocation of sleeve 33 by the pilot is accomplished by rotation, in the manner previously explained, of knob 24 which is integral with a hollow sleeve 25, provided with a right-hand thread of low pitch in engagement with a complemental female thread in the end of sleeve 31. A spring 37 engaging the rearward end of sleeve 33 presses its forward end against the rearward end of sleeve 25. By screwing this sleeve inward, sleeve 33 is moved to the right in Figure 2, and spring 37 is compressed. As sleeve 25 is retracted to the left in Figure 2 by counterclockwise rotation of knob 24, as seen in Figure 1, spring 37 expands and moves sleeve 33 a corresponding distance to the left. Because of the slight pitch of the thread on sleeve 25, very sensitive and precise regulation of the opening of apertures 36 is afforded in every position of valve 4. Again, although the fit between sleeves 31 and 33 is air-tight, no air compressing action occurs within the left end of sleeve 31 by sleeve 33 since it is vented through the bore of sleeve 25 to the atmosphere, as shown in Figure 2.

Automatic movement of valve 4 with respect to sleeve 31 is accomplished by deflection of diaphragm 43 to which the valve rod 42 is secured. The right side of this diaphragm, in Figure 2, is subjected to the pressure within a casing 44, similar to the can of an aneroid barometer except that it is provided with a bleed aperture 45, affording communication between the interior of the casing and the cabin pressure, and enabling equalization of the pressure inside and outside the casing by movement of air through such aperture at a predetermined flow rate. The left side of diaphragm 43 is subjected to cabin pressure, admitted by hole 38. If the rate of change in cabin pressure is so great that the flow permitted through aperture 45 is insufficient to keep the pressure within the casing at a corresponding value, and thus to equalize pressures at the opposite sides of the diaphragm 43, this diaphragm will be bulged, outwardly if the cabin pressure is decreasing rapidly, and inwardly if the cabin pressure is increasing at a rapid rate. Upon such decrease in cabin pressure, therefore, the central portion of diaphragm 43 would be moved to the left, moving valve rod 42 and its interconnected valve 4 also to the left with respect to sleeve 31. Conversely, if the cabin pressure is increasing rapidly, the diaphragm will move the valve 4 to the right in Figure 2, with respect to sleeve 31.

Figures 3, 4, 5:
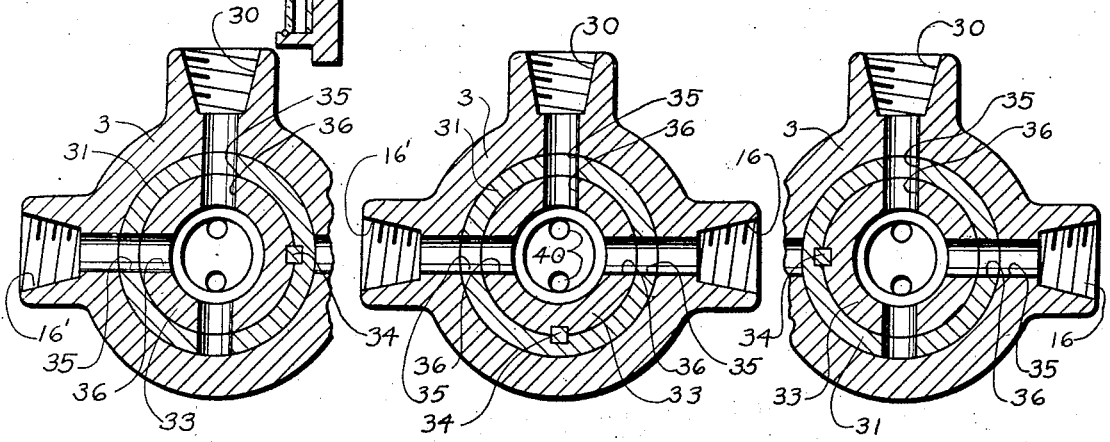
Figure 3 is a transverse sectional view through a portion of my control mechanism, on the line 3—3 of Figure 2, and Figures 4 and 5 are transverse sectional views similar to Figure 3, showing the operating parts in different positions.

The principle of operation of my control device is to regulate the amount of opening 36 exposed beyond valve 4 in various relative positions of the valve and sleeve 33. In order that my device may be very sensitive to variations in rate of cabin pressure change it will be noted that while the outer portions of apertures 36 are circular, the inner portions with which the valve cooperates are very narrow in an axial direction, so that small relative reciprocation of the valve and sleeve 33 may accomplish a considerable change in area of orifice exposed. On the other hand, because it may be desirable to reciprocate sleeve 33 for a considerable distance lengthwise of the sleeve 31, it is preferred that apertures 35 be elongated axially of the sleeve, although, as shown in Figures 3, 4 and 5, they may be of the same extent circumferentially.

Figure 6:
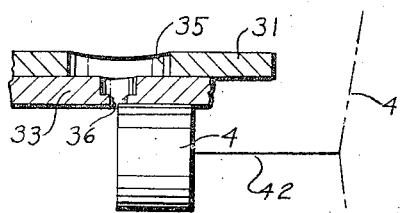

In order to explain more clearly the action of my device in accomplishing the different types of operation discussed, Figures 6 to 10 illustrate diagrammatically the various positions which would be assumed by sleeve 33 and valve 4 with respect to sleeve 31 for different positions of diaphragm 43 and the manually controlled sleeve, or the control knob 24. Assuming first that the aircraft has just taken off at sea level altitude with the control knob 24 set to dispose sleeve 33 in the position shown in Figure 2, unrestricted communication between the atmosphere and the flow control valve servo unit is afforded via passages 30 and 16. If the aircraft now starts to climb at a rapid rate the pressure in the cabin will tend to drop because of the lowered exterior pressure inducing greater flow past valve 1, although its opening may remain the same. The pressure within casing 44 will be greater than such reduced cabin pressure, and this pressure difference may become sufficiently large so that the air escaping through aperture 45 can not relieve it immediately. Consequently, the diaphragm 43 will be bulged outward, moving valve stem 42 and valve 4 to some position such as shown in Figure 6. Simultaneously arm 26 of gauge operating lever 27, pivoted at 28, will be swung to the left in Figure 2 by reason of its interengagement with valve rod 42. The swinging end of the lever will therefore drop and the clock spring 29 will cause the hand of gauge 22 to be deflected in a counter-clockwise direction, designating, as shown in Figure 1, that the cabin pressure is falling at a certain rate.

With valve 4 thus partially overlapping aperture 36, communication of conduit 16 with the external atmosphere, which is lower than cabin pressure, will be throttled, and the pressure differential between the lower and upper sides of piston 13 will decrease, since less escape is provided for air leaking about piston 13 from its lower to its upper side. Consequently valve 1 drops, and although the pressure differential between cabin and exterior pressure continues to increase, valve 1 will continue in a sufficiently closed position so that the drop in cabin pressure will take place at a substantially constant rate, which rate is much lower than the rate of drop in exterior pressure. Thus while the exterior pressure will be decreasing along line A—B of Figure 11, the cabin pressure may be dropping along line A—O, for example.

Figure 7:
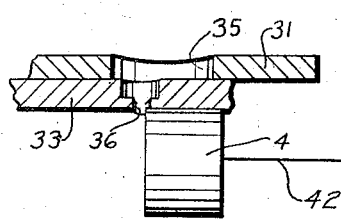

It will be seen that the rate of decrease in cabin pressure, the amount of bulge in diaphragm 43, and the amount of restriction of apertures 36 are all interrelated. Thus if a faster drop in cabin pressure is desired a greater opening of apertures 36 is required, and the greater the bulge which must be allowed in diaphragm 43. If a decrease in cabin pressure along line A—K of Figure 11 is desired, for example, the pilot may rotate knob 24 farther in a counterclockwise direction, which will allow spring 37 to move sleeve 33 to the left with respect to sleeve 31 into the position shown in Figure 7. The restriction of orifice 36 accomplished by valve 4 will thereby be decreased and more air may pass from the upper side of piston 13 through conduit 16 to the atmosphere, resulting in an increased pressure differential between the lower and upper sides of this piston, which will effect a farther opening of valve 1. Outflow of air from the cabin will thus be increased, the pressure differential between the interior and exterior of casing 44 in turn will be increased, and diaphragm 43 will be bulged to a greater extent, but not enough to restrict the openings 36 as much as they were when the sleeve 33 was in the position of Figure 6. This movement will cause additional lowering of the free end of lever 27, and spring 29 will swing the hand of gauge 22 farther in a counterclockwise direction to designate a higher rate of cabin pressure fall. Such rate of fall will still be controlled at a lower rate than the external pressure drop, however, because the new position of valve 4 will afford some restriction of aperture 36, as shown in Figure 7.

Obviously if a lower rate of pressure fall than that represented by the line A—O is desired, or if the pilot wishes to keep the cabin pressure constant within the limit of the space between lines A—B and C—D of Figure 11, rotation of knob 24 in a clockwise direction will move sleeve 33 to the right from the position shown in Figure 6, and the orifice 36 will be further restricted, causing a still less pressure differential between the lower and upper sides of piston 13 and a consequent closing movement of valve 1. Following through the reverse action of the several parts, the outflow past the valve will thereby be decreased so that the cabin pressure will not fall as rapidly, resulting in a lesser pressure differential between the interior and the exterior of casing 44. Diaphragm 43 will therefore have less of an outward bulge, and shaft 42 will move to the right into a position of equilibrium with greater restriction of apertures 36 than that shown in Figure 6. Simultaneously, by swinging of arm 26 to the right, the free end of lever 27 will be raised to rotate the hand of gauge 22 clockwise against the action of spring 29 into a position indicating a lower rate of cabin pressure fall.

Figure 10:
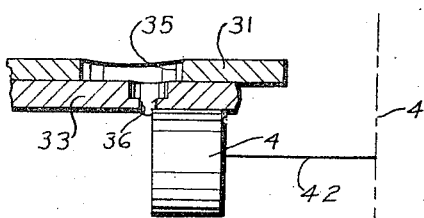

Whatever bulged position of equilibrium is assumed by diaphragm 43, when the aircraft has reached its cruising altitude the pressure within the cabin will continue to fall until it is equal to the exterior pressure, unless sleeve 33 has been shifted to the right a distance far enough so that its passage is still restricted to a greater or lesser extent with the diaphragm in neutral or planar position, such as shown in Figure 10. Such continuing cabin pressure fall at a constant altitude of the aircraft is represented in Figure 11 by lines O—E, M—E, and K—N, for example. With the exception noted, however, the cabin pressure, as stated, will eventually become the same as the external pressure, coinciding with the point on line A—B for the altitude at which the aircraft is cruising. In order to employ my control device effectively for the purpose of decreasing the rate of cabin pressure fall, therefore, it is not necessary that means be available for supplying air under pressure to the cabin, although such means normally would be provided.

Assuming now that the aircraft descends from the 8,000 foot altitude, the cabin pressure at such time being equal to the external pressure, and apertures 38 not restricted at all by valve 4, and that the rate of descent is high, the cabin pressure would increase, either because of entrance of exterior air in the opposite direction past valve 1 or by supply to the cabin of air under pressure. Such increase would cause a greater pressure outside casing 44 than within it, and diaphragm 43 consequently would be depressed to the right in Figure 2, moving valve stem 42 with it. Accompanying movement of valve 4 to the right would not change the size of the fully open orifices 36, but lever 27, by reason of arm 26 being swung to the right, would be raised to rotate the hand of indicator 22 clockwise, designating the rate of cabin pressure increase. Under such circumstances the cabin pressure, as well as the external pressure, would rise along the line E—A of Figure 11, and my device would have no effect to alter this natural tendency.

If it is desired to provide a controlled rate of pressure increase, such as along line O—A or K—A, during rapid descent of the aircraft, it is necessary before such descent commences to establish a supercharged condition within the aircraft cabin. Thus a cabin pressure rise at a rate considerably lower than the rate of increase in external pressure, such as along the line L—A, may be provided from 13,000 feet altitude down to zero altitude, if at the time such descent begins the cabin pressure corresponds to the external pressure at 8,000 feet, instead of being equal to the external pressure at 13,000 feet.

In order to establish a supercharged differential, either in anticipation of a subsequent rapid descent or to be maintained while cruising at a constant altitude, the knob 24 must be turned in a clockwise direction from the position of Figure 2 to provide a continuous restriction for the orifices 36, when the diaphragm 43 has come to rest after such differential is established, as shown in Figure 10. Ordinarily, in order to expedite the creation of the desired differential, knob 24 will be turned more than is necessary in a clockwise direction, so that the pressure will increase more or less rapidly until the desired cabin pressure is attained. During such inducing operation, therefore, the parts may assume the position of Figure 8 corresponding to a fairly slow rate of pressure increase, or they may move into a position such as shown in Figure 9, corresponding to a more rapid rate of increase. The corresponding rate will, of course, be indicated by gauge 22, its needle being deflected in a clockwise direction from the neutral position shown in Figure 1 to a greater or lesser extent. When the cabin altitude indicator 20 approaches the desired reading the knob 22 will be turned in a counterclockwise direction until the pointer of gauge 22 drops back to the zero position, in which the parts will assume relative positions somewhat as shown in Figure 10, and indicator 20 will come to rest.

If now the aircraft is to descend at a rapid rate from the 13,000 foot altitude, for example, the apparent cabin altitude is 8,000 feet, and it is desired to restrict the increase in cabin pressure to a rate less than the increase in atmospheric pressure, such as represented substantially by line L—A of Figure 11, the knob 24 will be turned in a clockwise direction, moving the sleeve 33 to the right into a position of Figure 9, for example. Since the aircraft is now descending the cabin pressure can increase without crossing the maximum pressure differential line C—D. The restriction of orifices 36 will cause less evacuation of the space above piston 13, and the decreased pressure differential on such piston will allow valve 1 to move toward closed position, restricting the cabin outflow. The cabin pressure will thereupon tend to rise at a rate faster than the pressure within casing 44 can be equalized through orifice 45, causing diaphragm 43 to be deflected inwardly until it assumes the position of equilibrium of Figure 9. Despite deflection of the diaphragm to the right it will be seen that the resultant restriction of orifice 36 is greater than that shown in Figure 10, so that the position of rest of valve 1 will be farther toward closed position, and the cabin pressure will continue to rise.

Figure 8:
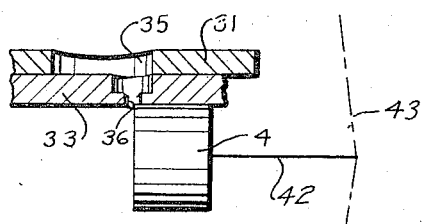
Figure 9:
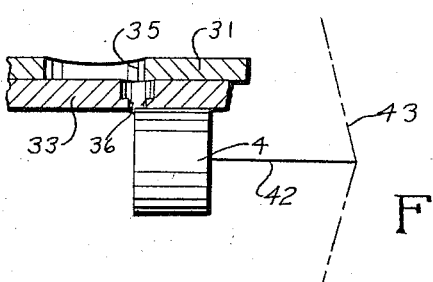

If a less rapid rise in cabin pressure were desired, which might be the case if the aircraft were descending to an elevation considerably above sea level, or were descending to sea level from a lower altitude, say 8,000 feet, such as along line O—A, the apparent cabin altitude being 3,000 feet in such case, knob 24 would not be turned as far in a clockwise direction, and the position of sleeve 33 would be farther to the left, so that the parts might assume a position of equilibrium such as shown in Figure 8. Under these conditions diaphragm 43 would be less depressed, the position of rest of valve 1 would not be as far to the right, and apertures 36 would be less restricted than under the conditions of Figure 9, but more than in the case of Figure 10, where the pressure is not changing in the cabin. Likewise the position of the pointer of gauge 22 would indicate a slower rise in cabin pressure corresponding to the position of diaphragm 43.

It will be obvious that representative operating conditions have been described, and that the degrees of restriction of the apertures 36 shown in Figures 6 to 10 inclusive are merely illustrative of types of operation, and are not intended to show the exact positions which would be assumed by the parts. With the diaphragm 43 in neutral position as shown in Figure 10, the restriction of apertures 36 would, of course, be greater if a higher pressure differential were to be maintained for a given altitude, or if it were desired to maintain a constant apparent cabin pressure within a higher altitude range.

Naturally the proportioning of the apertures 36 and 45 would depend upon the particular installation in which my device is to be used. Such factors as the size and clearance of piston 13, the amount of flow through the cabin, the size of valve 1, the sensitivity of control by knob 24, the deflection of diaphragm 43 for a given pressure differential between the interior and exterior of chamber 44, and various other factors must be considered in determining the proper dimensions for the several cooperating parts.

Summing up, it is now clear that the position of the valve 1 is as determined by the position of the servo piston 13; that the servo piston moves into various positions of equilibrium under the influence of a difference of pressures acting upon its opposite sides and in opposition to a biasing force, gravity and the Venturi action of the outflowing air, tending to close the valve 1; that this equilibrium results when the leakage past the piston 13 from its high-pressure lower face to its low-pressure upper face is exactly relieved by an equivalent outflow via 14 or via 16, 30, or both; that such equilibrium can be disturbed, thus requiring a movement to a new position of equilibrium, by a change in the rate of pressure relief via 14 or via 16, 30, or both; that such a change in the rate of pressure relief can occur as a result of change of external atmospheric pressure or of cabin absolute pressure, or both, or by a valving action; that such a valving action can, therefore, be used, under manual or automatic control, to effect a change in cabin pressure relative to external atmospheric pressure at a rate which differs from, and which may bear any chosen relation to, the rate of change of external atmospheric pressure; that regardless of the extent of control through the rate-of-pressure-change element 3, and regardless of its functioning or non-functioning, the differential-pressure sensitive device 18 is always capable of overriding, and under proper circumstances does invariable and automatically override, the control by the rate-of-pressure-change element 3, and always prevents cabin differential pressure from exceeding the value for which the differential-pressure sensitive device 18 is set.

What I claim as my invention is:

1. Mechanism for controlling the pressure within an aircraft cabin, comprising pressure responsive means for governing the cabin pressure, a conduit communicating unobstructedly with the exterior atmosphere, a member having therein an aperture communicating with said conduit, such conduit affording the sole communication of such member with the exterior atmosphere, and having therein another aperture communicating with the pressure responsive means, and means manually movable at all times to restrict in varying degrees one of such apertures, for throttling at will communication through said apertured member between said pressure responsive means and the exterior atmosphere, thereby to establish various stable operating conditions for said pressure responsive means.

2. Mechanism for controlling the pressure within an aircraft cabin, comprising pressure responsive means for governing the cabin pressure, a flow controlling member having therein an aperture for flow of fluid from said pressure responsive means, automatic means responsive to change in cabin pressure operable to vary the restriction of such aperture, and means manually movable, independently of said automatic means, to vary the restriction of such aperture when said automatic means are in position corresponding to constant cabin pressure.

3. Mechanism according to claim 2, and indicating means associated with the automatic means responsive to change in cabin pressure, for indicating the rate of pressure change within the aircraft cabin.

4. Mechanism for varying the pressure to which a pressure responsive device for governing the pressure within an aircraft cabin is subjected, comprising a conduit communicating with said pressure responsive device, a flow controlling member interposed in said conduit, and having an aperture therein, a valve adapted to vary the restriction of such aperture, automatic valve operating means responsive to changes in pressure in the aircraft cabin, whether rise or fall, and connected to move said valve with respect to such aperture, and means manually movable to vary fractionally the relationship of said flow controlling member and said valve for varying the degree of restriction of such aperture while said valve is in any position effected by said valve operating means.

5. Mechanism for varying communication between a pressure responsive device for governing the pressure within an aircraft cabin and the exterior atmosphere, comprising an unrestricted conduit communicating directly with the atmosphere, a cylinder having an aperture communicating with said conduit, and another aperture communicating with the pressure responsive device, a valve snugly reciprocable in said cylinder to vary the restriction of one of such apertures, means responsive to change in cabin pressure connected to move said valve, and manual means operable to move said cylinder with respect to said valve to vary the restriction of such aperture in all reciprocative positions of said valve effected by said means.

6. Mechanism for varying communication between a pressure responsive device for governing pressure within an aircraft cabin and a pressure source, comprising a conduit connected to such pressure source, a cylinder having a peripheral aperture and a second aperture, one of such apertures communicating with said conduit and the other communicating with the pressure responsive device, a valve received snugly within said cylinder and reciprocable with respect thereto for restricting one of such apertures, a diaphragm adapted to be deflected by a rapid change in cabin pressure connected to reciprocate said valve, and manually operable means for shifting said cylinder with respect to said valve to vary the restriction of such aperture by said valve while said diaphragm is maintained in undeflected position.

7. Mechanism according to claim 6, a rate-of-pressure-change gauge, and gauge operating means therefor interconnected for movement with the diaphragm to effect operation of said gauge to indicate the rate of pressure change within the cabin.

8. Mechanism for varying communication between a pressure responsive device for governing pressure within an aircraft cabin and a pressure source, comprising a conduit connected unobstructedly to such pressure source, a cylinder having an aperture communicating with said conduit, and another aperture communicating with the pressure responsive device, a valve received snugly within said cylinder and reciprocable with respect thereto for restricting one of the apertures therein, a diaphragm adapted to be deflected by a rapid change in cabin pressure connected to reciprocate said valve, and a screw having a low pitch thread manually rotatable for reciprocating said second cylinder with respect to said valve in every deflected position of said diaphragm, to vary the restriction of such aperture by said valve.

9. Mechanism for varying communication between a pressure responsive device for governing pressure within an aircraft cabin and a pressure source, comprising a conduit connected unobstructedly to such pressure source, a cylinder having three peripheral apertures disposed in the same radial plane, one of such apertures communicating with said conduit, and each of the other two apertures communicating with a different pressure responsive device, a second cylinder fitting snugly within said first cylinder and having three peripheral apertures disposed in the same radial plane and in circumferential positions corresponding with the three apertures in the first cylinder, said cylinders being relatively rotatable to dispose the aperture in the first cylinder communicating with said conduit in registry with any one of the apertures in said second cylinder, thereby to establish communication through said second cylinder between said conduit and either one or both of the apertures in said first conduit connected to a pressure responsive device, a valve received snugly within said second cylinder and reciprocable with respect thereto for restricting all the apertures therein simultaneously, valve reciprocating means responsive to a rapid change in cabin pressure connected to move said valve in response to such change for varying the restriction of the second cylinder apertures by said valve, and manually operable means for reciprocating said second cylinder with respect to said valve to vary the restriction of such apertures by the valve in any reciprocated position thereof established by said valve reciprocating means.

10. Mechanism for varying communication between pressure responsive devices for governing pressure within an aircraft cabin and a pressure source, comprising a conduit connected unobstructedly to such pressure source, a cylinder having three peripheral apertures disposed in the same radial plane, one of such apertures communicating with said conduit, and each of the other two apertures communicating with a different pressure responsive device, a second cylinder fitting snugly within said first cylinder and having three peripheral apertures disposed in the same radial plane in positions corresponding with the three apertures in the first cylinder, said cylinders being relatively rotatable to dispose the aperture in the first cylinder communicating with said conduit in registry with any one of the apertures in said second cylinder, thereby to establish communication through said second cylinder between said conduit and either one or both of the apertures in said first conduit connected to a pressure responsive device, a valve received snugly within said second cylinder and reciprocable with respect thereto for restricting all the apertures therein simultaneously, a diaphragm adapted to be deflected by a rapid change in cabin pressure connected to reciprocate said valve, and a screw having a low pitch thread manually rotatable for reciprocating said second cylinder with respect to said valve in every deflected position of said diaphragm, to vary the restriction of such apertures by said valve.

11. The combination of claim 10, a rate-of-cabin-pressure-change gauge associated with such mechanism, and guage operating means interconnected between the diaphragm and the gauge for operating the gauge to designate the rate of change in cabin pressure.

12. Mechanism to control aircraft cabin pressure, comprising a member deflectable to one side of a neutral position by an increase in cabin pressure, and to the other side of such neutral position by a decrease in cabin pressure, flow controlling means having a flow control aperture partially restricted by said member when in its neutral position, the degree of restriction of said aperture being automatically variable by a change in the degree of deflection of said member either side of its neutral position, and means manually movable to vary the initial degree of restriction of such aperture by said deflectable member when in its neutral position.

13. Mechanism to control aircraft cabin pressure, comprising a member deflectable to one side of a neutral position by an abrupt increase in cabin pressure, and deflectable to the other side of such neutral position by an abrupt decrease in cabin pressure, and flow controlling means including a valve operatively connected to said deflectable member, disposed to restrict a flow control aperture in said flow controlling means when said deflectable member is in its neutral position, and movable by said deflectable member to decrease the degree of restriction of such aperture by deflection of said member in response to an abrupt increase in cabin pressure and to increase the degree of restriction of such aperture by deflection of said member in response to an abrupt decrease in cabin pressure.

14. Mechanism for controlling the pressure within an aircraft cabin, comprising a valve for controlling flow of air through the cabin, cylinder and piston means connected to move said valve and interfitting loosely for flow of air within the cylinder around the piston from its high-pressure side to its low-pressure side, and mechanism for controlling the rate of air flow through said cylinder, including a member apertured for flow therethrough of such air, and means manually movable at will to vary fractionally the effective size of the aperture in said member, thereby to change, by increments, the pressure differential within said cylinder on opposite sides of said piston, for moving said valve.

15. Mechanism for controlling the pressure within an aircraft cabin, comprising a valve for controlling flow of air from the cabin, a cylinder, a piston fitting loosely in said cylinder and connected to move said valve, means affording communication between the cylinder at one side of said piston and the aircraft cabin, means affording communication between the cylinder at the other side of the piston and the atmosphere, and mechanism for controlling the rate of airflow within said cylinder and around said piston from the cabin pressure communication side to the atmosphere communication side, including a member in said means communicating with the atmosphere, apertured for flow therethrough of air from said cylinder to the atmosphere, and means manually movable at will to vary fractionally the effective size of the aperture in said member, thereby to change, by increments, the pressure differential within said cylinder on opposite sides of said piston.

16. Mechanism to control aircraft cabin pressure, comprising a member deflectable to one side of a neutral position by an abrupt increase in cabin pressure, and deflectable to the other side of said neutral position by an abrupt decrease in cabin pressure, flow controlling means including a valve operatively connected to said deflectable member, disposed to restrict a flow control aperture in said flow controlling means when said deflectable member is in its neutral position, and movable by said deflectable member to decrease the degree of restriction of such aperture by deflection of said member in response to an abrupt increase in cabin pressure and to increase the degree of restriction of such aperture by deflection of said member in response to an abrupt decrease in cabin pressure, and means manually movable to vary the degree of restriction of such aperture by said valve for a given degree of deflection of said member, for regulating the flow through such aperture corresponding to such given degree of deflection of said member.

JAMES B. COOPER.